United States Patent [19]

Mumcu

[11] Patent Number: 5,696,227
[45] Date of Patent: Dec. 9, 1997

[54] PROCESS FOR THE BATCHWISE PREPARATION OF POLYLAUROLACTAM

[75] Inventor: Salih Mumcu, Marl, Germany

[73] Assignee: Huels Aktiengesellschaft, Marl, Germany

[21] Appl. No.: 661,021

[22] Filed: Jun. 10, 1996

[30] Foreign Application Priority Data

Jul. 12, 1995 [DE] Germany .................. 195 25 319.1

[51] Int. Cl.⁶ ............................................. C08G 69/16
[52] U.S. Cl. .................... 528/318; 528/310; 528/315; 528/323; 528/326; 428/474.4
[58] Field of Search ...................... 528/323, 310, 528/318, 315, 326; 428/474.4

[56] References Cited

U.S. PATENT DOCUMENTS

| | | | |
|---|---|---|---|
| 4,077,946 | 3/1978 | Enenshtein et al. | 528/326 |
| 5,149,758 | 9/1992 | Matthies | 528/318 |
| 5,283,315 | 2/1994 | Kawakami et al. | 528/326 |
| 5,362,448 | 11/1994 | Kawakami et al. | 528/326 |

*Primary Examiner*—James J. Seidleck
*Assistant Examiner*—P. Hampton-Hightower
*Attorney, Agent, or Firm*—Oblon, Spivak, McClelland, Maier & Neustadt, P.C.

[57] ABSTRACT

A process for the batch preparation of polylaurolactam in the melt, involving introducing molten, anhydrous laurolactam at a temperature of up to 280° C. into a pressure-resistant reactor heated externally to a maximum of 290° C.; introducing steam having a temperature in the range from 170° to 280° C. and a pressure in the range from 8 to 64 bar into the laurolactam until the laurolactam is heated under pressure to a temperature in a range from 280° to 290° C., to give a ring opened precondensed product; and, if desired, after release of pressure, polycondensing the ring opened precondensed product.

15 Claims, No Drawings

PROCESS FOR THE BATCHWISE PREPARATION OF POLYLAUROLACTAM

BACKGROUND OF THE INVENTION

1. Field of the Invention

The invention relates to a batch process for the preparation of polylaurolactam in the melt.

2. Discussion of the Background

Batchwise preparation of polylaurolactam is known (DE-C 14 95 147; 14 95 149; 15 20 551; 19 07 032; 21 52 194). Conventionally, the laurolactam is precondensed in a first stage under steam pressure in pressure-resistant reactors at product temperatures of 270° to 330° C. causing ring opening and, after releasing the steam pressure, is polycondensed in a second stage.

Batchwise preparation of polylaurolactam is conventionally performed in jacket-heated pressure reactors. In such a process, laurolactam is heated, using the jacket, to a sufficiently high temperature in order to achieve ring opening and precondensation. In order to bring the starting product to the required temperature rapidly enough, jacket temperatures of up to 360° C. are required. Due to these high temperatures, in the localized area near the walls of the reactor, the product experiences very high thermal stress, so that in the polylaurolactam, ultimately, there is a significant content of gel specks which adversely affects the product quality. During production, the thermal stress is higher as more product is processed, the jacket temperature is higher and the thermal stress is longer.

SUMMARY OF THE INVENTION

Accordingly, one object of the present invention is to provide a batch process for the preparation of polylaurolactam which avoids excessive thermal stress and gives a polylaurolactam product low in gel specks.

A further object of the present invention is to provide a batch process for the ring-opening and precondensation of laurolactam which avoids excessive thermal stress and results in a product suitable for polycondensation into a polylaurolactam product low in gel specks.

These and other objects of the present invention have been satisfied by the discovery of a process for producing polylaurolactam comprising introducing molten, anhydrous laurolactam at a temperature of up to 280° C. into a pressure-resistant reactor heated externally to a maximum of 290° C., then introducing steam at a temperature in the range from 170° to 280° C. and a pressure in the range from 8 to 64 bar into the laurolactam until the laurolactam is heated under pressure to a temperature in the range from 280° to 290° C. to effect ring opening and precondensation, and optionally, after release of pressure, polycondensing the ring opened-precondensed product.

DETAILED DESCRIPTION OF THE PREFERRED EMBODIMENTS

The present invention relates to a process for the batch preparation of polylaurolactam in the melt, comprising the steps of:

introducing molten, anhydrous laurolactam at a temperature of up to 280° C. into a pressure-resistant reactor heated externally to a maximum of 290° C.;

introducing steam having a temperature in the range from 170° to 280° C. and a pressure in the range from 8 to 64 bar into the laurolactam until the laurolactam is heated under pressure to a temperature in a range from 280° to 290° C., to give a ring opened precondensed product; and, optionally, after release of pressure, polycondensing the ring opened precondensed product.

The process according to the present invention is suitable primarily for the preparation of homopolylaurolactam. However, up to 10% by weight, preferably up to 5% by weight, of the laurolactam can be replaced by other polycondensable comonomers.

Suitable comonomers include caprolactam, ω-aminododecanoic acid, adipic acid, azelaic acid, sebacic acid, suberic acid, dodecanedioic acid, hexamethylenediamine, methylpentamethylenediamine, decanediamine, or mixtures thereof.

To carry out the process according to the invention, molten anhydrous laurolactam at a temperature of up to 280° C., preferably at a temperature in the range from 160° to 270° C. is introduced into a pressure-resistant reactor. In order to increase the temperature to the required reaction temperature of 280° to 290° C., steam is then introduced into the melt. The steam has a temperature in the range from 170° to 280° C., preferably from 200° to 250° C., and a pressure in the range from 8 to 64 bar, preferably from 15 to 40 bar. The amount of steam required depends on temperature and pressure. The amount of steam required is an amount sufficient to allow the melt to reach the necessary temperature and at the same time introduce sufficient water to achieve sufficiently rapid ring opening. Setting the necessary parameters lies within the scope of ability of those skilled in the art and can readily be established without additional experiments. The steam can be introduced into the melt in any suitable manner such as using a dip pipe or directly from below.

The polycondensation reaction of laurolactam after ring opening is well known in the art. The reaction can be carried out in the presence of modifiers and catalysts, but their presence is not required. With regard to the polycondensation reaaction, reference can be made to Kirk-Othmer, Encyclopedia of Chemical Technology, 3rd Edition, Vol. 18, Wiley & Sons (1982), pp. 328 and 435, the relevant portions of which are hereby incorporated by reference.

The products obtained according to the present invention generally have a relative solution viscosity ($\eta_{rel}$) in the range from 1.9 to 2.7.

The polylaurolactam obtained can be processed conventionally to give molding and coating compositions. In particular, it is particularly suitable for producing films, which are obtained in unexpectedly high quality, since they have virtually no gel specks (fish eyes).

Having generally described this invention, a further understanding can be obtained by reference to certain specific examples which are provided herein for purposes of illustration only and are not intended to be limiting unless otherwise specified.

EXAMPLES

The relative solution viscosity ($\eta_{rel}$) of the polylaurolactam was determined using a 0.5% strength by weight m-cresol solution at 25° C. (DIN 53 727/ISO 307).

Experiments not according to the present invention are labelled with letters.

All experiments were carried out in a pressure reactor with jacket heating of the lower half. The upper half of the reactor was not heated. The reactor had a volume of 20 m$^3$. It was equipped with a spiral stirrer and a torque meter which enabled the polycondensation to be terminated at the desired viscosity. In addition, it had a valve in the lower region in order to introduce steam.

Half of the polylaurolactam melts obtained were always discharged without melt filtration and the other half in each case with melt filtration and were then granulated. The first half of the dried granules was processed to give 20 μm-thick blown films. The gel speck rating was evaluated subjectively. The second half of each batch was subjected to melt filtration on pleated 25 μm filters in order to evaluate the extent of gel specks objectively using the pressure measurements upstream of the filter. In each experiment, a new filter was used after discharging approximately 5 t of melt.

The results are summarized in Table 1.

Experiment 1

In the course of about one hour, 10 t of anhydrous laurolactam melt were introduced into the reactor via a heat exchanger which heated the melt from 170° to 270° C. The jacket temperature of the reactor was set to 285° C. In the course of 45 minutes, approximately 450 kg of steam (T=250° C.) were then introduced from below into the melt. The pressure in the gas phase increased during this stage to 18 bar and the melt temperature to 290° C. The ring opening and the precondensation took 5 hours at the self-adjusting pressure (18–22 bar). The superatmospheric pressure was released and the reactor contents were polycondensed under nitrogen blanketing up to a stirrer torque corresponding to a relative solution viscosity $\eta_{rel}$ of 2.00.

5 t of the resulting polylaurolactam melt at 280° C. were first discharged without a filter by a gear pump at a constant throughput of 1.25 t/h; a further 5 t were filtered through a pleated 25 μm screen. The initial pressure and the mean pressure rise per hour were determined upstream of the filter. The strands were cooled with water and granulated. Blown films were produced from the dried granules of the first half of the batch and evaluated.

Experiment 2

In the course of approximately one hour, 10 t of anhydrous laurolactam melt were introduced into the reactor through a heat exchanger which heated it from 165° to 265° C. After addition of 15 kg of adipic acid, the jacket temperature of the reactor was set to 275° C. In the course of 55 minutes, approximately 430 kg of steam (T=250° C.) were then introduced into the melt from below. The pressure in the gas phase increased during this stage to 18 bar and the melt temperature to 280° C. The ring opening and the precondensation took 5 hours at the self-adjusting pressure (18–21 bar). The superatmospheric pressure was released and the reactor contents were then polycondensed under nitrogen blanketing up to a stirrer torque corresponding to a relative solution viscosity $\eta_{rel}$ of 2.00.

5 t of the resulting polylaurolactam melt at 272° C. were first discharged without a filter by a gear pump at a constant throughput of 1.25 t/h; a further 5 t were filtered through a pleated 25 pm screen. The initial pressure and the mean pressure rise per hour were determined upstream of the filter. The strands were cooled with water and granulated. Blown films were produced from the dried granules of the first half of the batch and evaluated.

Experiment 3

10 t of anhydrous laurolactam melt at 180° C. were introduced into the reactor. After addition of 15 kg of adipic acid and 500 g of phosphoric acid, the jacket temperature of the reactor was set to 280° C. and the contents heated to 265° C. in the course of 6 hours. Approximately 425 kg of steam (T=250° C.) were then introduced into the melt from below. The pressure in the gas phase increased during this stage to 18 bar and the melt temperature to 280° C. The ring opening and the precondensation took 4 hours at the self-adjusting pressure (18–22 bar). The superatmospheric pressure was released and the reactor contents were polycondensed under nitrogen blanketing up to a torque corresponding to a relative solution viscosity $\eta_{rel}$ of 2.00.

5 t of the resulting polylaurolactam melt at 276° C. were first discharged without filter by a gear pump at a constant throughput of 1.25 t/h; a further 5 t were filtered through a pleated 25 μm screen. The initial pressure and the mean pressure rise per hour were determined upstream of the filter. The strands were cooled with water and granulated. Blown films were produced from the dried granules of the first half of the batch and evaluated.

Experiment A 10 t of laurolactam melt (170° C.) and 450 kg of water were introduced into the reactor. A temperature of 320° C. was set on the heating jacket of the reactor. The melt heated to 290° C. in the course of 5 hours and the pressure in the gas phase increased to 18 bar. The jacket temperature was then controlled to 285° C. and precondensation was carried out for 5 hours at the self-adjusting pressure (18–22 bar). The further procedure corresponded to that of Experiment 1.

Experiment B 10 t of laurolactam melt (165° C.), 15 kg of adipic acid and 430 kg of water were introduced into the reactor. A temperature of 310° C. was set on the heating jacket of the reactor. The melt heated to 280° C. in the course of 5½ hours and the pressure in the gas phase increased to 18 bar. The jacket temperature was then controlled to 275° C. and precondensation was carried out for 5 hours at the self-adjusting pressure (18–21 bar). The further procedure corresponded to that of Experiment 2.

Experiment C 10 t of hot laurolactam melt (180° C.), 15 kg of adipic acid, 500 g of phosphoric acid and 425 kg of water were introduced into the reactor. A temperature of 310° C. was set on the heating jacket of the reactor. The melt heated to 280° C. in the course of 5 hours and the pressure in the gas phase increased to 18 bar. The jacket temperature was then controlled to 280° C. and precondensation was carried out for 4 hours at the self-adjusting pressure (18–21 bar). The further procedure corresponded to that of Experiment 3.

TABLE 1

| Experiment | Heating phase | | Melt temperature at the | | Pressure upstream of the filter | |
|---|---|---|---|---|---|---|
| | Reactor temperature [°C.] | Residence time in the reactor [h] | end of the polycondensation [°C.] | Gel speck rating of the blown film*) | at the beginning of filtration [bar] | mean increase [bar/h] |
| 1 | 285 | 1 h + 45 min | 280 | 1–2 | 62 | 0.4 |
| 2 | 275 | 1 h + 55 min | 272 | 1–2 | 72 | 0.3 |
| 3 | 280 | 6 h + 1 h | 276 | 1–2 | 67 | 0.6 |
| A | 320 | 5 h | 280 | 3–4 | 65 | 4.2 |
| B | 310 | 5.5 h | 272 | 3 | 75 | 3.1 |
| C | 310 | 5 h | 276 | 3 | 69 | 3.8 |

*)Rating 1: no specks
Rating 2: very small specks
Rating 3: relatively large specks
Rating 4: relatively large specks and lumps This application is based on German Patent Application 195 25 319.1, filed with the German Patent Office on Jul. 12, 1995, the entire contents of which are hereby incorporated by reference.

Obviously, additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for the batch preparation of polylaurolactam in a melt, comprising the steps of:
   introducing molten, anhydrous laurolactam at a temperature of up to 280° C. into a pressure-resistant reactor heated externally to a maximum of 290° C.;
   introducing steam having a temperature in the range from 170° to 280° C. and a pressure in the range from 8 to 64 bar into the laurolactam until the laurolactam is heated under pressure to a temperature in a range from 280° to 290° C., to give a ring opened precondensed product; and
   after release of pressure, polycondensing the ring opened precondensed product.

2. The process according to claim 1, wherein the laurolactam is introduced at a temperature in the range from 160° to 270° C.

3. The process according to claim 1, wherein the steam introduced has a temperature in the range from 200° to 250° C.

4. The process according to claim 1, wherein the steam introduced has a pressure in the range from 15 to 40 bar.

5. A film prepared from polylaurolactam produced by the process of claim 1.

6. The process of claim 1, wherein the ring opened, precondensed product is polycondensed to a relative solution viscosity, $\eta_{rel}$, of from 1.9 to 2.7.

7. The process of claim 1, wherein up to 10% by weight of the laurolactam introduced is replaced by at least one polycondensable comonomer.

8. The process of claim 7, wherein the at least one polycondensable comonomer is a member selected from the group consisting of caprolactam, ω-aminododecanoic acid, adipic acid, azelaic acid, sebacic acid, suberic acid, dodecanedioic acid, hexamethylenediamine, methylpentamethylenediamine, decanediamine and mixtures thereof.

9. The process of claim 7, wherein the polycondensable comonomer is present in an amount of up to 5% by weight, based on the laurolactam added.

10. The process of claim 1, wherein the steam is introduced directly into the laurolactam from below.

11. The process of claim 1, wherein the steam is introduced into the laurolactam through a dip pipe extending to a lower half of the pressure-resistant reactor.

12. A process for ring opening and precondensation of laurolactam, comprising:
   introducing molten, anhydrous laurolactam at a temperature of up to 280° C. into a pressure-resistant reactor heated externally to a maximum of 290° C.;
   introducing steam having a temperature in the range from 170° to 280° C. and a pressure in the range from 8 to 64 bar into the laurolactam until the laurolactam is heated under pressure to a temperature in a range from 280° to 290° C., to give a ring opened precondensed product.

13. The process according to claim 12, wherein the laurolactam is introduced at a temperature in the range from 160° to 270° C.

14. The process according to claim 12, wherein the steam introduced has a temperature in the range from 200° to 250° C.

15. The process according to claim 12, wherein the steam introduced has a pressure in the range from 15 to 40 bar.

* * * * *